United States Patent [19]
Wolfe et al.

[11] Patent Number: 5,357,182
[45] Date of Patent: Oct. 18, 1994

[54] SHOPPING CART THEFT PREVENTION SYSTEM

[76] Inventors: Steven M. Wolfe, 2024 N. Argyle, Apt. E, Los Angeles, Calif. 90068; John V. Biondo, Jr., 6712 Beck Ave., North Hollywood, Calif. 91606

[21] Appl. No.: 9,836

[22] Filed: Jan. 27, 1993

[51] Int. Cl.[5] .................... H02P 3/12; B60R 25/08; B62B 5/04
[52] U.S. Cl. .................. 318/379; 318/375; 188/1.12; 188/162; 280/33.994; 280/DIG. 4; 70/226
[58] Field of Search ............ 318/364, 370, 373, 375, 318/376, 379, 380, 16, 580; 180/19.1, 65.1, 65.2; 188/1.12, 19, 31, 158, 159, 161, 162; 280/33.994, DIG. 4; 340/426; 16/18 R, 35 R; 70/225, 226

[56] References Cited
U.S. PATENT DOCUMENTS 3,652,103  3/1972  Higgs .
4,242,668  12/1980 Herzog .
4,577,880  3/1986  Bianco .
4,591,175  5/1986  Upton et al. .
5,064,012  11/1991 Losego .
5,194,844  3/1993  Zelda .

Primary Examiner—Bentsu Ro
Attorney, Agent, or Firm—Beehler & Pavitt

[57] ABSTRACT

A system for braking a wheeled vehicle when it is attempted to be moved outside of a defined perimeter wherein at least one wheel of the vehicle is mechanically coupled to a shaft carrying means to create upon rotation of the shaft, through electromagnetic action an electric current at a pair of terminals; circuit means, responsive to a predetermined signal, to short said terminals, thereby creating a counter electromagnetic force to inhibit rotation of said shaft and wheel coupled thereto to brake the latter; means to generate said predetermined signal; and means to radiate said signal locally along said perimeter.

14 Claims, 5 Drawing Sheets

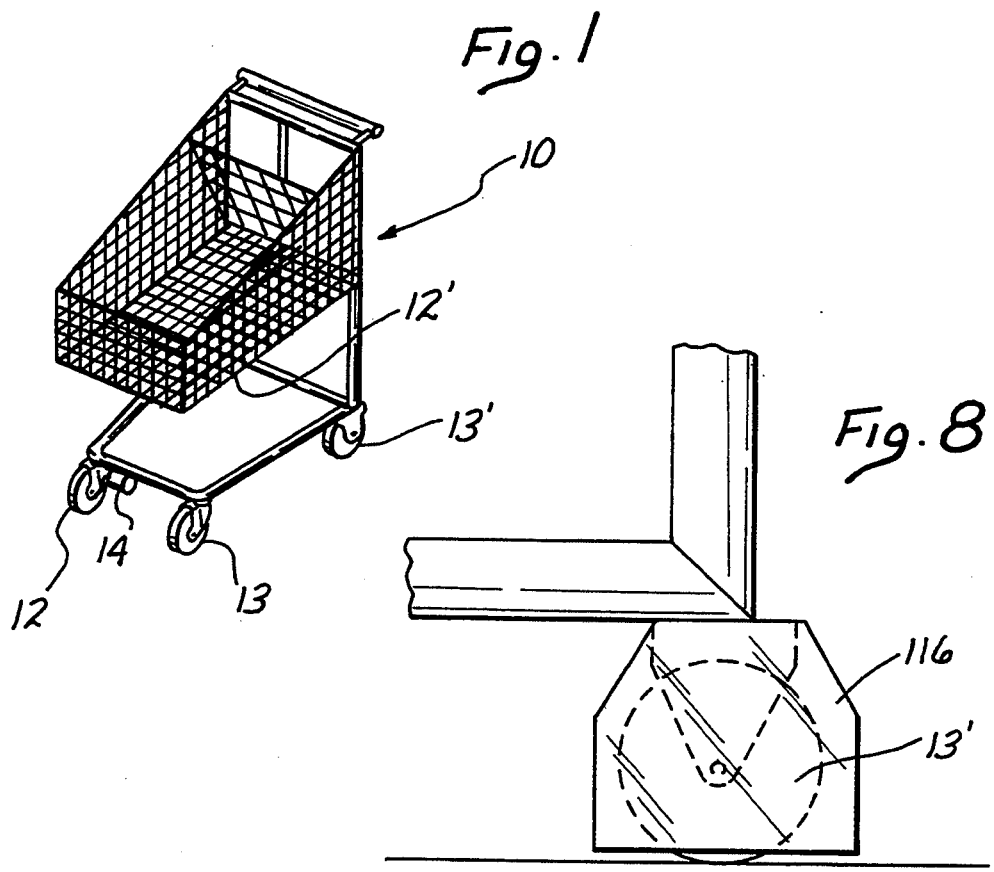
Fig. 1
Fig. 8
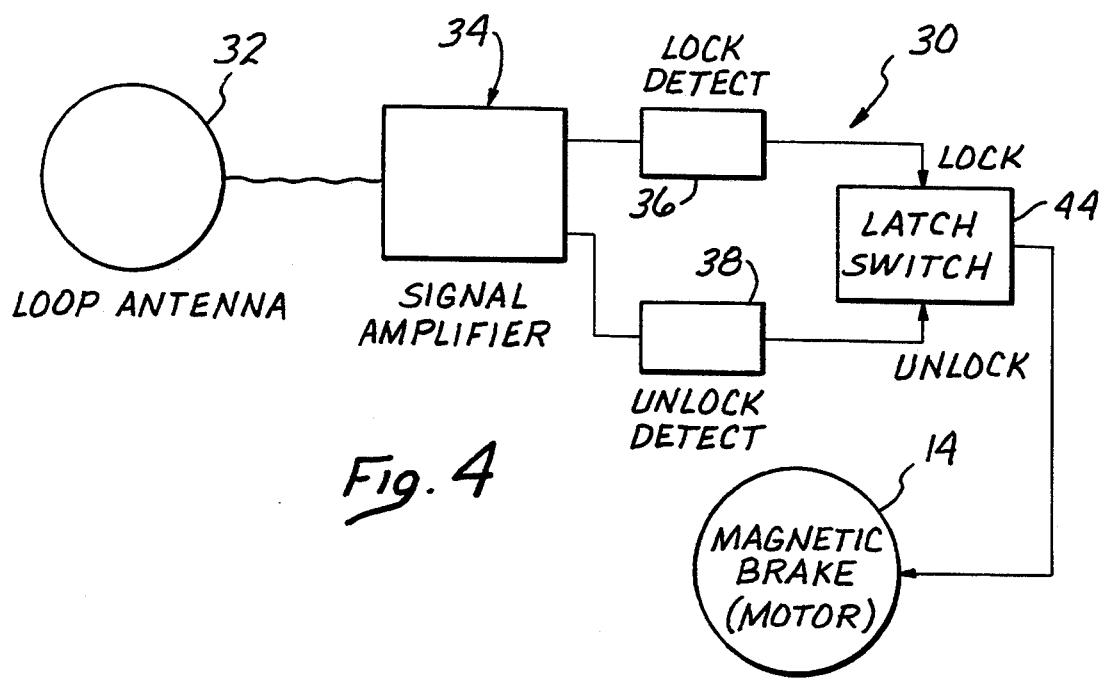
Fig. 4

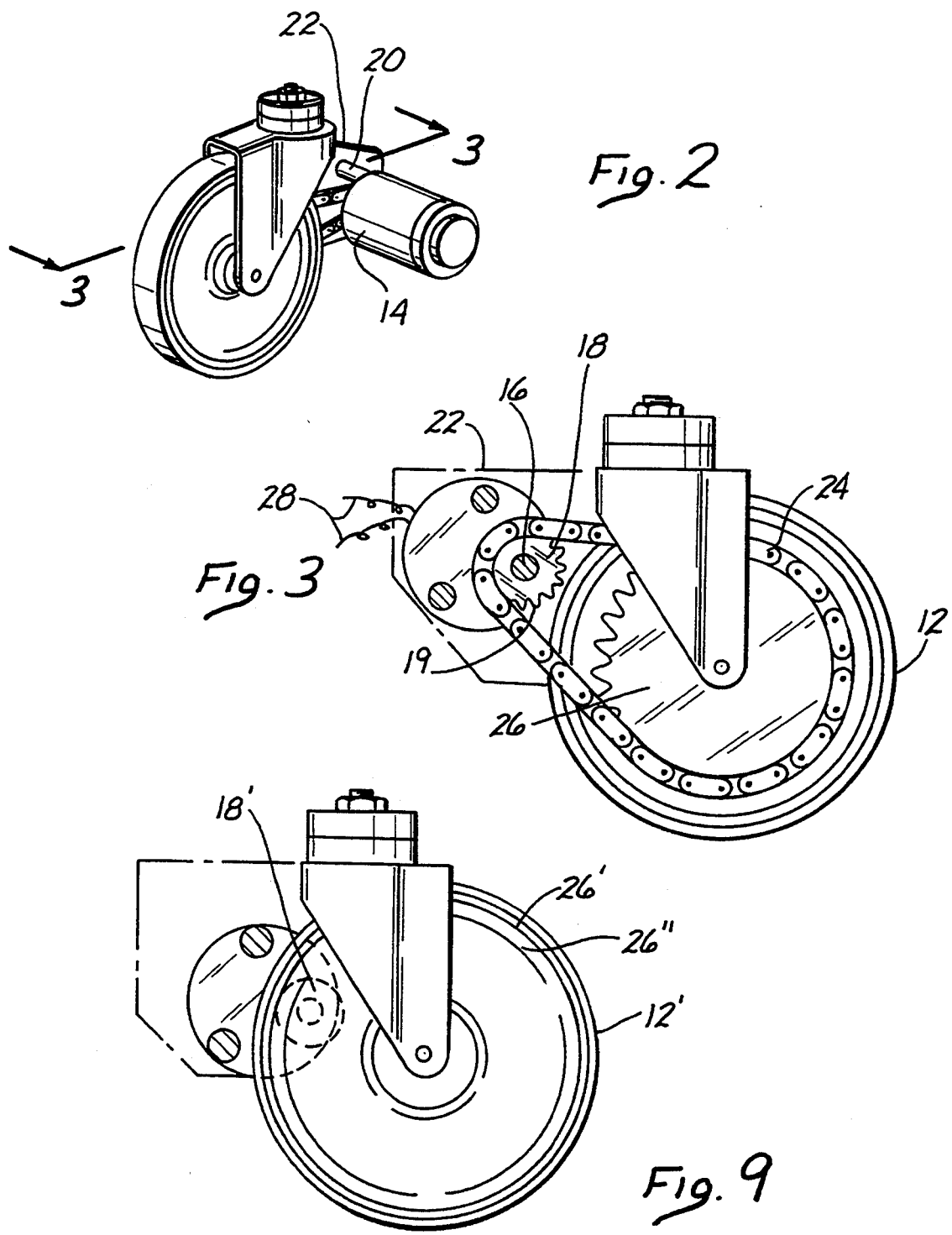

SHOPPING CART THEFT PREVENTION SYSTEM

FIELD OF THE INVENTION

This invention relates generally to the field of systems for locking and unlocking rolling members, such as wheels, with particular application to shopping carts of the kind provided by grocery and other stores for the convenience of patrons in carrying their purchases both in the store and from the check-out counters to their vehicles in the store parking lot.

BACKGROUND OF THE INVENTION

Shopping carts found in grocery stores, hardware stores and general merchandise stores are customarily provided by such stores for the convenience of patrons both in toting purchases within the stores, as well as from the stores' check-out counters to the patrons' vehicles in the store parking lots. For those store patrons who have vehicles in the store parking lots, upon reaching their respective vehicles and transferring their purchases to the trunks or other portions of their vehicles, they have no further use for the carts. Consequently, such patrons either leave the carts in and about the parking lot, or in some cart receiving stand which may be conveniently placed in the parking lots, for retrieval by store personnel and return to the store entrance area for use by subsequently arriving patrons. Unfortunately, however, many store patrons may not come to the store in cars or other vehicles, and, where the patron may have purchased one or more weighty items, the patron is often tempted to place them in a shopping cart provided by the store and simply to wheel the cart not only out of the store, but out of the store's parking lot and to the patron's residence or other destination. When this is done by store patrons, the carts are frequently left somewhere on the sidewalk adjacent to the patron's residence or in some other public location. The carts may then be picked up by a retrieval service with some type of truck or other vehicle onto which the carts may be placed. This, however, represents an added expense to the store to secure the return of its shopping carts, but it is considered worthwhile since the carts may cost the store as much as $125.00 to $150.00 a piece and those carts which are now being equipped with TVs and VCRs for advertising store merchandise may cost considerably more. These latter carts, moreover, are powered by batteries which must be recharged, sometimes daily. In addition, if so many carts are removed that none are available for any substantial number of customers, the latter may limit their purchases or make none at all, to the store's business loss.

Of greater concern to the stores, however, is the tendency for some patrons, particularly those who may be homeless, to wheel the carts out of the parking lots and use them for convenient carriers for their personal belongings such as clothes, bedrolls, etc. The carts so utilized are usually secreted somewhere, when not in use on public thoroughfares, so that they cannot be retrieved by any pick-up service employed by the store. In such cases, store identification plates or markings may be removed by such cart thieves, and where the carts are of a commonly used variety, it becomes difficult for even a retrieval service to determine the identity of the store to which the cart should be returned. In effect, then, the carts are simply lost and must be replaced by the store at costs stated above. Depending upon the site of the store and the nature of the population in its immediate vicinity, store cart losses can vary substantially. In poorer areas, cart thefts may be of such magnitude as to force the store to charge much greater prices than normal simply to cover its cart losses.

Recognizing the problem of cart thefts, a number of efforts have been directed to providing systems for rendering carts immobile when they are moved out of the store parking lot or beyond a certain distance from the store. Examples of such prior art systems may be found in U.S. Pat. Nos. 4,242,668, 4,772,880, 3,652,103 and 3,495,688.

In U.S. Pat. Nos. 4,242,668 and 4,772,880, radio transmitters are used to trigger some type of solenoid actuated by a receiver on the cart which receiver is responsive to the transmitter under certain conditions. When the solenoid is actuated, the wheel is suddenly locked.

In U.S. Pat. No. 3,652,103, a locking solenoid is triggered by a light beam, while in U.S. Pat. No. 3,495,688, a locking solenoid is magnetically actuated.

In a different area of technology, systems have been provided for discouraging animals from passing over a certain perimeter defined by some type of radiating fencing which, when the animal, such as a dog, approaches too closely, may produce conditions disliked by the dog. A patent in this area is U.S. Pat. No. 3,753,421.

In addition, a company by the name of Kart Kontrol Inc. of Alta Loma, Calif., has experimented with providing perimeter control for shopping carts, but little has been heard concerning the same since an announcement in the Jan. 4, 1990, Glendale (California) Daily News.

For one reason or another, none of the various systems for preventing cart thefts appears to have been adopted by any stores. A principal reason for this failure, despite the need, has been the expense involved in setting up the system and installing its signal reactive components in the shopping carts. Obviously, if the cost of providing the system and the components for each cart closely approaches the cost of the cart itself, or exceeds the store's overall economic loss through cart thefts, it is not, as a practical matter, worth the trouble and expense to have a system adopted. It appears that this economic factor has militated strongly against the adoption of any of the prior art cart anti-theft systems.

Another problem with prior art devices is that where the wheel disabling mechanism is some type of solenoid which may thrust a locking pin into some portion of the wheel and suddenly prevents its rotation, the immediate stopping could be hazardous not only to persons attempting to steal the carts, but also to patrons who are simply using the carts for normal purposes. A sudden locking of a cart wheel could result in spilling the contents of a full cart, or even throwing out a small child who may be riding in the cart. A lawsuit against the store might be a result.

For whatever reason, to the knowledge of the present inventors, no cart anti-theft system has been successfully tried and found to be economically feasible; hence, none has been adopted despite the need.

SUMMARY OF THE INVENTION

The present invention overcomes the foregoing described problems which appear to have prevented the adoption of any of the prior art systems by avoiding the use of solenoids which must be heavy enough to effect a wheel locking and, therefore, require substantial battery power not only for a receiver for a triggering signal, but to move a pin or other locking device carried by an effective solenoid. In addition, the system of the present invention does not result in an abrupt locking of the wheel or wheels as results from a solenoid being injected into an opening in the cart wheel.

In addition, the system of the present invention may be installed at a relatively low cost.

These objectives are accomplished by providing, in lieu of any solenoid, a magnetic braking system in which a cart wheel is coupled to a rotating element either within, or producing, a magnetic field, where the rotation serves to generate an electric current which, when shorted, produces a counter EMF inhibiting further rotation of the element coupled to the cart wheel, and hence, further rotation of the cart wheel itself.

In one form, this magnetic braking of the present invention may be practically effected by providing a small direct current permanent magnet gear motor, the shaft of which is coupled by gearing or otherwise, to rotate with a cart wheel the rotation of which is to be impeded. When this shaft, and the armature which it carries, is rotated by the rotation of the wheel to which it is geared, the motor produces a direct current at a pair of output terminals.

Also employed with this gear motor is a small battery operated circuit which can detect a low power signal and, with such detection, effects a shorting of the motor, thereby producing a counter-electromagnetic force (EMF) which inhibits further rotation of the motor shaft; and, through the gearing to the cart wheel, further rotation of the cart wheel itself. This inhibition, however, is not as abrupt as when a solenoid injects a pin into a wheel orifice. Instead, turning of the wheel can only be accomplished by the application of considerable force. This renders the wheel effectively inoperable.

The circuit may be actuated by some type of low powered signal of a specific character (e.g. frequency, wave form, etc.) generated by a transmitter connected to an antenna extending to one or both sides of a gate or other type of portal; or, in the case of an open parking lot, an antenna wire which could either be strung above or buried below and around a perimeter of the area within which it is desired to have use of the carts confined. The transmitter may be of a small low powered variety which, preferably, may be located within the store itself.

It is also a feature of the present invention to enable the wheel to be unbraked by providing in the circuit the ability to detect a different type of signal which may be emanated from a second antenna laid parallel the first antenna, but disposed more proximately, as for example, 4–6 feet, to the store. The second signal, which should have a distinctly different character from the first signal can be generated either by a second transmitter, or by the same transmitter, and when detected by the circuit, would, in effect, break the shorting connection between the terminals of the motor which has been effected by reception of the first signal. With the breaking of this connection, the counter-EMF would cease so the armature and shaft of the motor would again be free to rotate and no longer inhibit rotation of the wheel to which it is gearingly coupled. Thereby, when the wheel becomes braked by moving it across the field of radiation of the first antenna, it may be released from braking by backing it across the radiation field of the second antenna.

While the dual antenna system is preferred, it will be appreciated that the second un-braking signal could also be generated by a separate hand-held small transmitter. Such a transmitter could be provided to a store employee charged with locating carts which have been rendered inoperable by a single antenna buried or strung across an exit portal or around the open perimeter of a parking lot.

Further, where there is only such a single antenna, the transmitter could on command be made to emit an unblocking signal, as, for example, at store closing time when the clerks could be sent round the perimeter to bring back disabled carts.

It is also a feature of the invention to provide shrouds on at least the pair of wheels which are opposite the pair which includes one locking wheel. The purpose of these shrouds is to prevent a patron from moving the cart with a braked wheel by tilting the cart backwards, or forwards, or sideways to lift the braked wheel off the ground surface and move the cart on two or more of the remaining three wheels.

It is further contemplated in the present invention sometimes to utilize the current generated by the rotation of the cart wheel connected to the motor (or other electromagnetic element), by connecting it to the battery, where the latter is of the rechargeable type, to charge up the battery. However, where this is done the circuit for effecting shorting of the terminals upon receipt of the actuating signal, must be capable of simultaneously disconnecting the battery from the charging terminals in order to prevent a shorting of the battery itself.

From the foregoing summary and the more detailed explanation of the preferred embodiment of the invention hereinafter set forth, it will be appreciated that a much less expensive inhibiting system may be provided to prevent the theft of shopping carts. In addition, the braked wheels of the cart may be easily released by simply withdrawing the cart and confining its use to the area within the desired perimeter. Further, when braking does occur, it is not effected so abruptly as to result in a possible overturning of the cart or spilling of the contents including, possibly, a small child.

DESCRIPTION OF THE DRAWINGS

In the accompanying drawings,

FIG. 1 is a perspective view of a typical shopping cart on which the impeding device in the present arrangement has been installed.

FIG. 2 is an enlarged perspective view of the lower left hand wheel of FIG. 1.

FIG. 3 is an enlarged side elevation of the wheel shown in FIG. 2 looking in the direction of the arrows 3–3.

FIG. 4 is a block diagram of the circuitry employed to control the magnetic breaking of the motor.

FIG. 8 is a side elevation of a rear wheel of a cart equipped with a shroud.

FIG. 9 is a side elevation similar to FIG. 3, but showing a frictional engagement of the motor and cart wheels.

DESCRIPTION OF THE PREFERRED EMBODIMENT

Figure 1A:
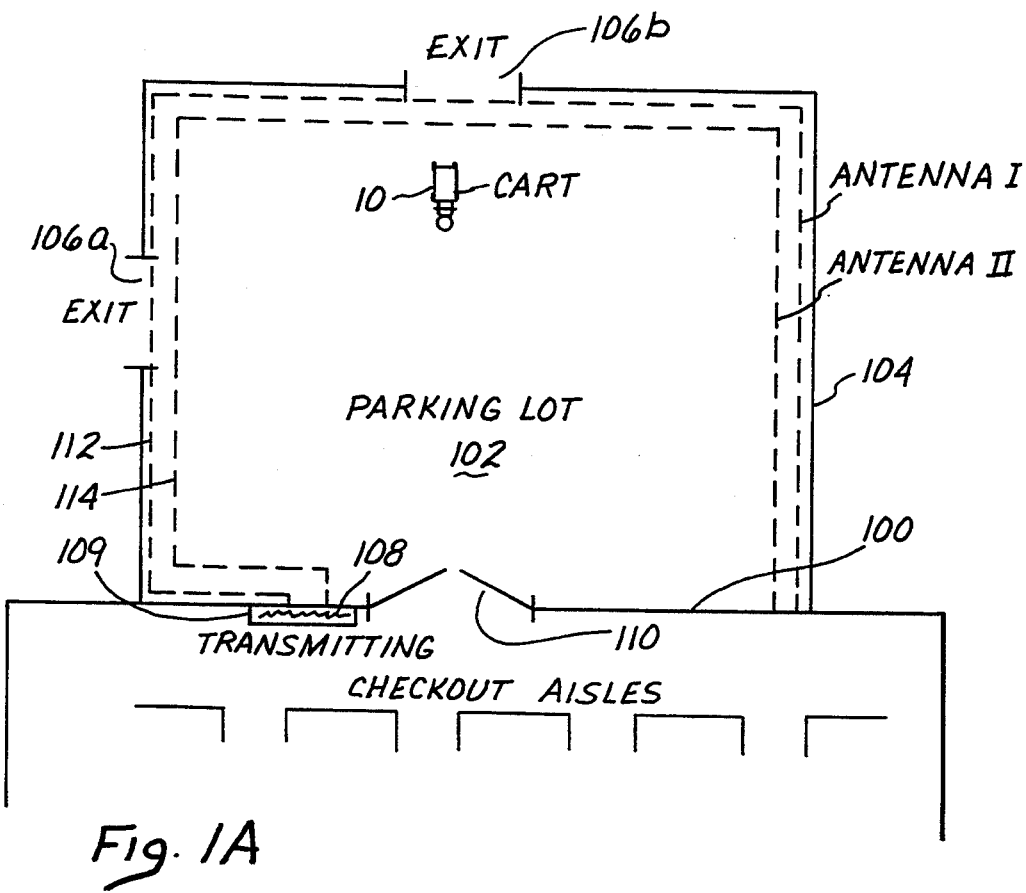
FIG. 1A is a plan view, partially schematic, of one side of a store and parking lot, showing an arrangement for employing the present invention.

Referring to FIG. 1 of the drawings, there is shown a typical shopping cart 10 to the lower right hand front wheel 12 of which is attached a small direct current permanent magnet gear motor 14 shown in greater detail in FIGS. 2 and 3. One suitable motor is a model CYNC-43 200 24 volt DC gear motor made by the Motor Division of Robert Coleman of Rockford, Ill. This motor is internally geared to its armature shaft (not shown) in a 10 to 1 ratio for its shaft 16 which carries a gear 18. The motor 14 may be mounted by pins 20 to a wheel bracket extension plate 22 with its gear or sprocket 18 being coupled by a chain 24 to a gear 26 coaxially mounted on, and to rotate with, the wheel 12. A pair of terminals 28 extend from the motor, but preferably would be connected to a circuit 30 of the type shown in FIGS. 4 and 5, preferably disposed within the housing of the motor 14.

Figure 6:
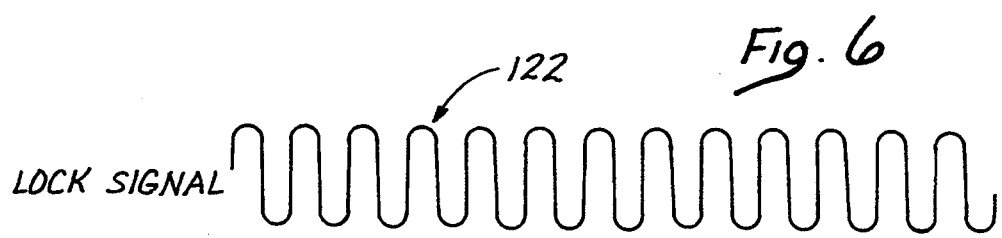
FIG. 6 is possible lock signal wave.
Figure 7:
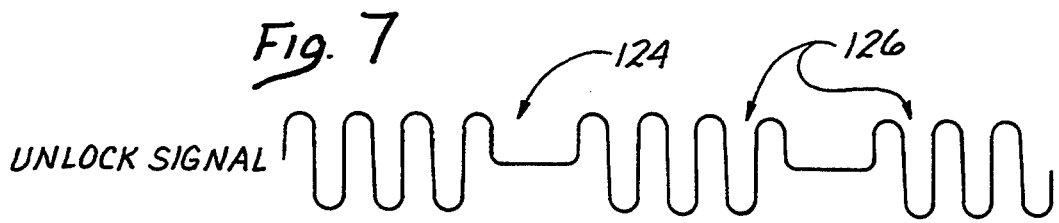
FIG. 7 is an alternate unlock signal wave.
Figure 5:
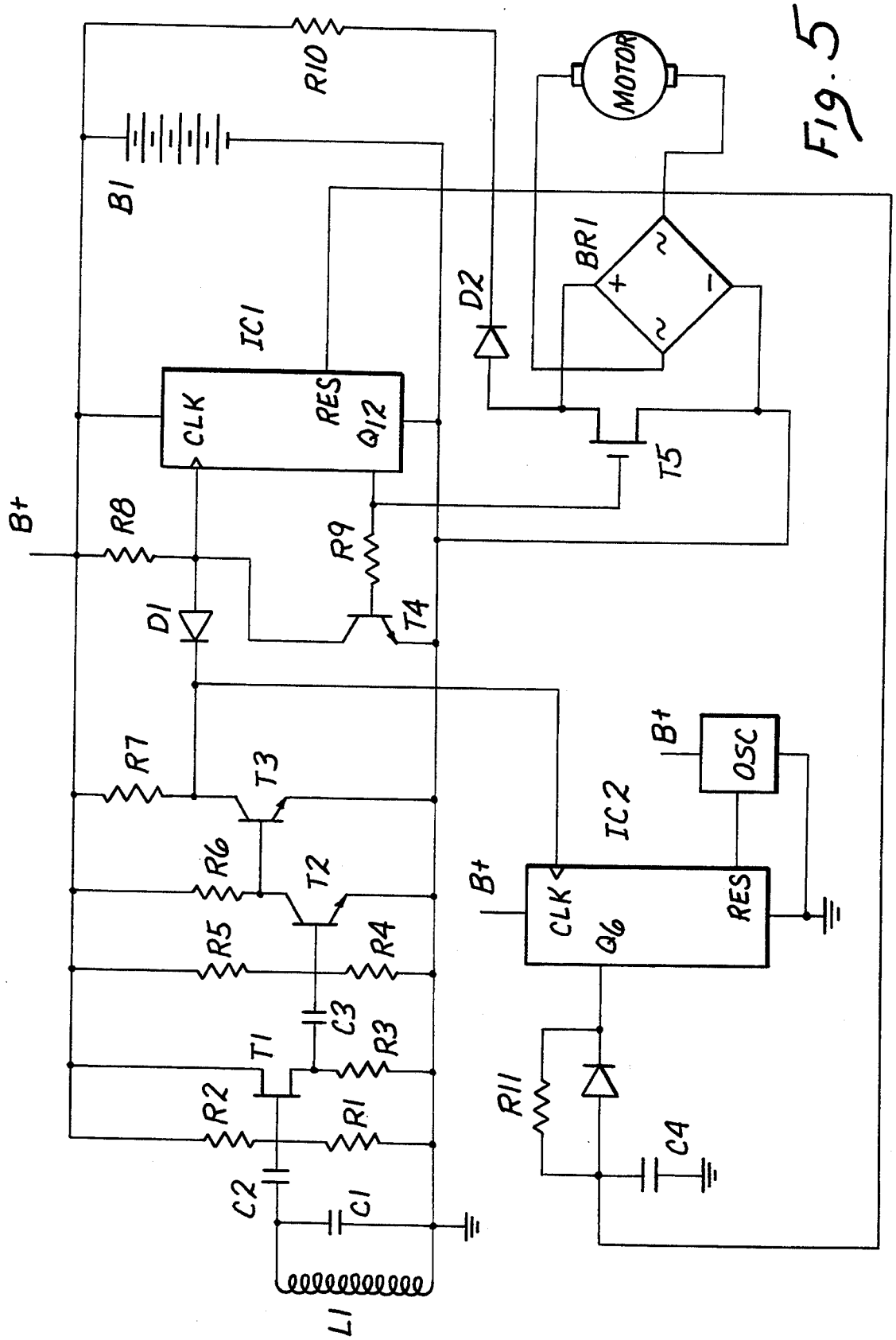
FIG. 5 is a schematic diagram of a circuit to perform the functions illustrated in FIG. 4.
Figure 12:
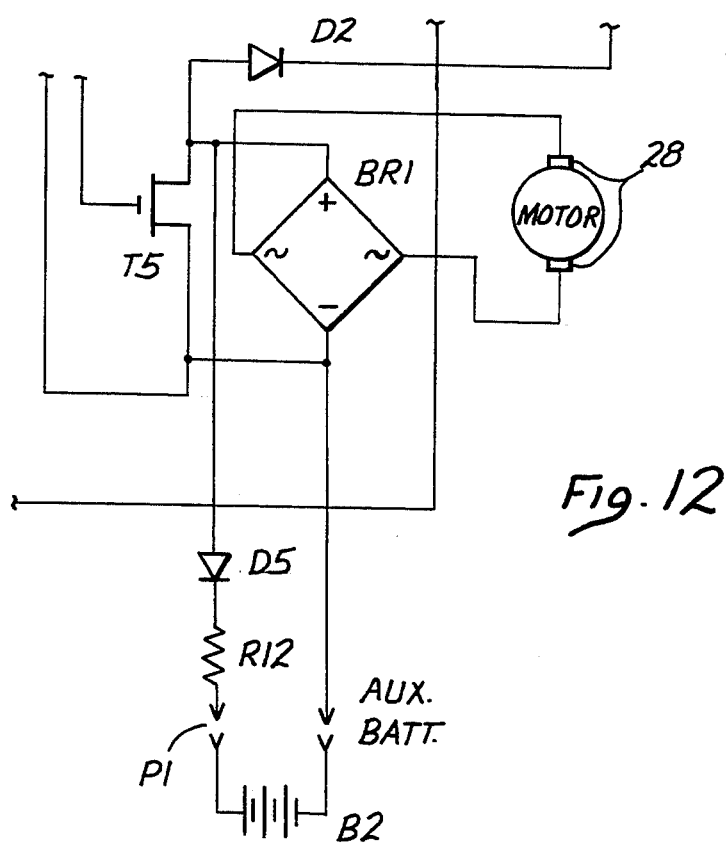
FIG. 12 is a schematic diagram involving the right side of FIG. 5, but modified to include a charger for an auxiliary battery and a shorting prevention arrangement.

The circuit 30 may comprise some type of antennae 32 connected to a signal amplifier 34, the output of which is passed either to the lock detecting circuit 36 or the unlock detecting circuit 38. Each of these detectors 36 and 38 is designed to detect a signal of a different characteristic, such as that 122, shown for a lock signal in FIG. 6 or, the unlock signal 124, shown in FIG. 7, as more fully explained in connection with FIG. 5. Depending upon which type of signal is detected, the latch switch 44 will either short the terminals 28 to effect braking, or unshort the terminals 28, to allow free turning of the motor armature (not shown) and the cart wheel 12. The manner in which the circuit of FIG. 5 operates to accomplish the functions described is as follows:

Coil L1 and condenser C1 form a resonant tank circuit 120 which is tuned to the frequency of the signal in the antenna 112 surrounding the perimeter of the parking lot 102 (FIG. 1A). Condenser C2 couples the A.C. component from the tank circuit 120 into source follower T1 which is biased to its linear operation area by resistors R2 and R1. Condenser C3 couples the A.C. component from the source follower into transistors T2 and T3 together with their bias and pullup resistors R4, R5, R6 and R7. Diode D1 couples the amplified signal into counter IC1, but prevents the inhibiting action of transistor T4 from squelching the signal at the collector of transistor T3. Counter IC1 is normally in a reset state in which output Q12 is low. If the signal from antenna 112 is received, amplified and delivered to the clock input of IC1, then, after a predetermined number of pulses, typically about 4096, Q12 will go high and turn transistor T4 on which will freeze the count at that number. Q12 going high also turns on transistor T5 which shorts out motor terminals 28 via the bridge rectifier BR1. This stable locked condition will persist until a very specific unlock signal 124 (FIG. 7) is received by the circuit through the same inductive pickup and transistor arrangement above described. This signal 124 is in the form of periodic bursts 126 of specified numbers of pulses. These pulses 126 are coupled to counter IC2 which is periodically reset by oscillator OSC. The normal condition of the IC2 counter is a zero count forced each time OSC pulses the counter. If a specific number of pulses is received which causes Q6 to go high and stay high for a time period long enough to pass through low pass filter network R11 and C4, then this signal will cause a high signal on IC1 which will unlock the wheel 12. Diode D2 and resistor R10 provide a recharging voltage to battery B1 which is generated when the motor 14 turns as a result of normal movement of the cart 10, but the diode D2 prevents any shorting of the battery B1 when the motor terminals 28 are shorted in the manner described above since current from the battery B1 cannot flow back past diode D2.

Where it is desired to use the EMF generated by the rotation of the motor to charge an auxiliary battery B2 which might be employed to power some other electrical device or apparatus (such as an advertising TV or VCR) mounted on the cart, an addition to the FIG. 5 circuit could be provided as shown in FIG. 12. As may be seen in the latter figure, a diode D5, a circuit limit resistor R12 and suitable interconnect P1, D2, prevents possible draining of battery B1 by the auxiliary battery B2, or draining of the battery B2 when the motor terminals 28 are shorted.

It should be appreciated that the circuit of FIG. 5 avoids sudden stopping of the cart wheel, as would be the case where a solenoid is activated to push a pin type element into an opening in the wheel. This is because of the resistance and capacity of transistor T5 which causes the transistor T5 to build up its shorting of the motor terminals 28 through the bridge rectifier on a somewhat gradual basis when Q12 "goes high". Such build-up could be further attenuated by inserting an additional resistor (not shown) between R9 and T5, and/or a capacitor (also not shown) between T5 and the negative side of bridge rectifier BR1.

In use, the operation of the system may be understood with reference to FIG. 1A. In this figure, there is shown in plan view the front entrance 100 of a store which opens into a parking lot 102. The parking lot may have some type of perimeter fence 104 with entrance/exits 106a and 106b. The low power transmitter 108 may be installed near the store doors 110. The transmitter 108 should be appropriately housed in a cabinet 109 which is accessible only to authorized store personnel. The transmitter or transmitters 108 should be adapted to generate two different signals such as 122 and 124 (FIGS. 6 and 7), signal 122 being emitted from transmitter through an antennae 112 and signal 124, from a second antennae 114. Each of the antennas 112 and 114 should extend from the transmitter around the perimeter of the parking lot to cover particularly all exitable areas, such as 106a and 106b. Desirably, the antennas 112 and 114 should be buried a few inches below the ground surface or sufficiently below such surface to prevent the antennae wires from being dug up from knowledgeable cart thieves, but not so deep as to prevent effective radiation of the signals above them for at least 6 feet above the ground surface. Antennae 114 should be disposed, preferably parallel antennae 112, but inwardly toward the store entrance 110 from antennae 112.

With the system thus set up and activated, should a patron attempt to push a cart 10 out of an exit such as 106a, for example, as soon as the cart 10 comes close enough to antennae 112, the receiver circuit 30 will detect the locking signal 122 and thereupon short the terminals 28 of the motor 14. This will produce a counter electromagnetic force which will inhibit rotation of the motor armature, the shaft 16 and gear 18, and this inhibition will be amplified and transmitted via the chain 24 and gear sprocket 26 to the wheel 12, thereby effectively disabling the wheel 12. This will prevent a patron from further rolling a cart 10 beyond one of the exits 106a, 106b. However, if the cart 10 should be drawn back from the exit to cross the antennae 114, the circuit 30 will pick up the signal 124 through the unlock detect portion of the circuit 38 and thereby cause the latch/switch to reopen the shorted circuit between the terminals 28. Thereby, any attempt to roll the wheel 12 will not be frustrated by the development of a counter EMF.

To prevent a potential cart thief from moving the cart despite having a braked wheel 12, by tilting the cart backwards to take the wheel 12 and its adjacent wheel 13 off the ground surface, it is also a feature of the present invention to provide a shroud 116 over each of the rear uncensored wheels of the cart 12' and 13'. As will be readily understood from an examination of FIGS. 1 and 8, where the cart 10 is so equipped with shrouds 116 over the wheels 12' and 13', it becomes physically impossible to tilt the cart 10 back sufficiently to elevate its front wheels 12 and 13 so that the cart may be rolled on its rear wheels 12' and 13' with the front wheels 12 and 14 elevated.

In the embodiment of FIG. 9, it may be seen that, in lieu of the chain and gear sprockets 18, 24 and 26, shown in FIG. 3, the gear 18' may either be frictionally engaged with an inner rim surface 26' of the wheel 12'. The gear 18' could be provided with teeth similar to the teeth 19 on gear 18 and the inner rim 26' could be provided with gear teeth 26" [shown only in outline for direct engagement with the teeth 9 (not shown)] on gear 18'. From the foregoing description of the preferred embodiment of the present invention, it will be appreciated that an effective system for preventing theft of shopping carts is provided by the present invention. Should a store patron or other person attempt to remove a cart from the parking lot perimeter, at least one wheel of the cart is disabled, and the cart simply cannot effectively be pushed further. The stopping, however, is not abrupt as where a pin is thrust into the wheel by a solenoid. Any rolling of the wheel immediately creates a counter EMS which strongly inhibits further turning of the wheel, thereby disabling it. Moreover, the cart may not be tilted to enable it to be pushed by lifting it off of its disabled wheel. However, after the wheel is thus effectively braked, anyone may be able to unlock the wheel by simply drawing it back across the second and inner antenna 112.

Lastly, the devices to set up and maintain the system, including installations and the parts, may be provided at a reasonable cost so as to render the system economically feasible.

Although the foregoing description involves the presently preferred embodiment of the invention, its principles may be utilized in other ways. Thus, instead of using the motor 14, a magnetic braking arrangement may be specifically designed to accomplish the desired result. For example, there are shown in FIGS. 10 and 11, two types of magnetic brakes which could be substituted for the motor 14.

Figure 10:
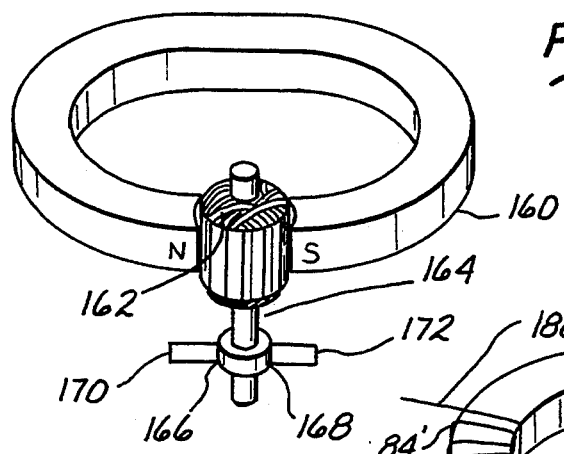
FIG. 10 is a perspective view, partly schematic of a different type of electromagnetic device for braking not involving a motor of the type shown in FIGS. 2 and 3.

In FIG. 10, a permanent magnet 160 may be arranged as a stator within which a coil 162 with a shaft 164 may rotate. Brushes 166, 168 serve to connect the coil leads 170, 172 to a shorting and unshorting circuit of the type described in reference to FIGS. 4 and 5. Just as in the case of the motor 14, a counter EMF will inhibit rotation of the shaft 164 so that if this shaft is coupled to a cart wheel, such as 12, rotation of the cart wheel 12, will be braked.

Figure 11:
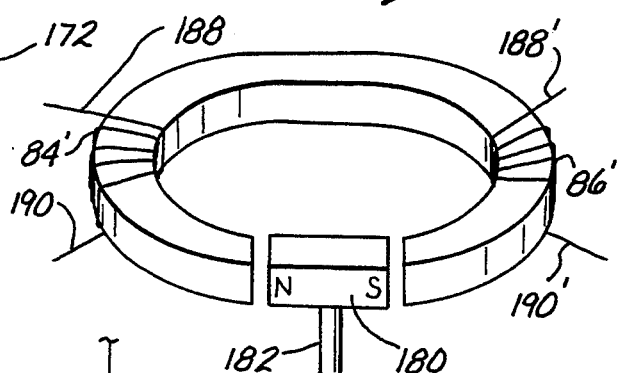
FIG. 11 is a view, similar to FIG. 10, of a still different type of electromagnetic device for braking also not involving any motor of the type shown in FIGS. 2 and 3.

FIG. 11 shows an alternative magnetic brake in which a magnet 180 on a shaft 182 rotates within the coils 84', 86', the leads 188, 190 from which are connected to the shorting and/or unshorting type of circuit shown in FIGS. 4 and 5. Shorting of the coils 84', 86' will render it difficult for the magnet 180 to rotate within the counter EMF created by the shorting so that if the shaft 182 is engaged with a wheel 12, rotation of the latter will be braked.

While the controlled magnetic braking of the present invention has been specifically described for use in connection with shopping carts, it could have application to preventing undesired movement from a particular defined area of many types of wheeled vehicles such as, for example, perambulators, golf carts, wheelchairs, etc. Thus, all that is necessary is to provide some type of magnetic brake arrangement associated with one or more wheels of the vehicle which arrangement will be triggered by a signal to initiate braking or unbraking when the vehicle passes a predetermined perimeter covered or not covered by the signal.

We claim:

1. A system to prevent the theft of shopping carts from a predetermined area in the vicinity of a store, said area having at least one path through which store patrons may exit away from the store, each said shopping cart having a plurality of wheels on which the cart may be rolled, said system comprising:

Means to generate a first signal of a predetermined character;

first signal radiating means connected to said means to generate a first signal and disposed to radiate said predetermined first signal across each exitable path from said predetermined area;

a direct current permanent magnet gear motor mechanically engaged with at least one of the wheels of the cart, said motor having a rotatable shaft and said shaft being engaged to rotate with said one wheel at a multiple of rotations for each rotation of said wheel with which it is engaged;

said motor having a pair of output terminals for the voltage generated by said motor upon rotation of said motor shaft;

circuit means to detect the first signal radiated by said first signal radiating means when the circuit means is brought within a predetermined proximity of said radiating means, and battery means to power said circuit means;

said circuit means being connected to the pair of output terminals, and normally maintained in a first condition wherein voltage potential between said pair of output terminals is available for providing a source of electrical energy, but said circuit means being shiftable to a second condition wherein said pair of terminals are shorted by connection to each other, thereby producing a counter-electromagnetic force inhibiting further rotation of the motor shaft;

said circuit means, upon detecting the predetermined first signal, shifting from its normally maintained first condition to its second condition, whereby with further rotation of the motor shaft being inhibited, such inhibition renders difficult further rotation of said one wheel of the cart with which said motor shaft is mechanically engaged.

2. The system as disclosed in claim 1 wherein the means to generate a first signal is adapted to generate a second signal of a different predetermined character from the first signal and a second signal radiating means is provided to radiate said second signal, said second signal radiating means being spaced apart from the first signal radiating means and disposed more proximate to the store at at least one of said exitable paths from the predetermined area;

and said circuit means is further adapted also to detect the second signal when the circuit means is brought within a predetermined proximity of said second signal radiating means, and, upon detecting said second signal, to shift said circuit means from its second condition back to its first condition.

3. The system as described in claim 1, wherein said radiating means comprises a wire embedded below and across all exitable store paths.

4. The system as described in claim 2, wherein both the first and second signal radiating means are disposed parallel to each other and embedded in below and across all exitable paths from the predetermined area.

5. The system as described in claim 1, wherein the rotatable shaft of the motor is engaged to rotate with said one wheel by a sprocket and gear combination.

6. The system as described in claim 1, wherein the shaft of said motor is engaged to rotate with said one wheel by a second wheel of a smaller diameter and frictionally engaged to said one wheel.

7. The system as described in claim 1, wherein the battery means is rechargeable and said circuit means includes connections between the output terminals and the battery means for charging the battery means when said at least one wheel is rotated, and said circuit means is normally maintained in its first condition, but current flow from the battery to the shorted terminals is prevented when the circuit means is shifted to its second condition.

8. The system as described in claim 1, wherein at least one of the other wheels not engaged with the motor is provided with a shroud which, if an attempt is made to tilt the cart about an axis through the other wheel, the shroud prevents the cart from being rolled solely upon the other wheel.

9. A combination to brake a rotatable wheeled vehicle to inhibit its movement from a predetermined area, said combination comprising:

rotatable means magnetically to generate an electric current at a pair of terminals by rotation of said rotatable means, said rotatable means being mechanically coupled to at least one wheel of said vehicle, so that rotation of said at least one wheel, upon movement of the vehicle, causes the generation of an electric current at said terminals;

electrically powered circuit means associated with said rotatable means and connected to said pair of terminals, said circuit means being responsive to a predetermined signal to effect a shorting of said pair of terminals, thereby developing a counter EMF which inhibits further rotation of said rotatable means and of said at least one wheel to which it is mechanically coupled; and signal generating means, being disposed to radiate such predetermined signal at one or more points about said predetermined area, such that, when an attempt is made to roll the vehicle from said area, said signal causes said circuit means to respond and short said terminals, thereby developing such counter EMF to brake the at least one wheel of said vehicle.

10. The combination as described in claim 9 wherein the combination includes a second means to generate and radiate a second signal of a different predetermined character from that radiated by the signal generating means; and the circuit means is responsive to the second signal to unshort said pair of terminals after they have been shorted, so that the braking of the vehicle is terminated.

11. The combination as claimed in claim 10 wherein the second means is disposed to radiate the second signal in a different portion of said predetermined area.

12. The combination as claimed in claim 10 wherein the second means is a hand held unit.

13. The combination as provided in claim 9 wherein the electric power for said circuit means is provided by a rechargeable battery having a second pair of terminals which are connected to said pair of terminals for recharging the battery upon the generation of electric current at said pair of terminals, but at least one of the connections between the second pair of terminals and the pair of terminals is provided with diode means in series with said at least one connection, to prevent the shorting of the pair of terminals from causing a shorting across the second pair of terminals of the battery.

14. The combination as provided in claim 13 wherein there is a second and auxiliary rechargeable battery which is carried on the vehicle to provide electric current for an electrical device utilized on the vehicle, said second battery having a third pair of terminals also connected to the motor pair of terminals for recharging the second battery upon the generation of electric current at said motor pair of terminals, but at least one of the connections between the third pair of terminals and the pair of terminals is provided with diode means in series with said at least one connection, to prevent the shorting of the pair or terminals from causing a shorting across the third pair of terminals of the second battery.

* * * * *